United States Patent [19]

Sweedler

[11] Patent Number: 5,235,533
[45] Date of Patent: Aug. 10, 1993

[54] STORE ROUNDING IN A FLOATING POINT UNIT

[75] Inventor: Jonathan Sweedler, Sunnyvale, Calif.

[73] Assignee: Intel Corporation, Santa Clara, Calif.

[21] Appl. No.: 881,043

[22] Filed: May 11, 1992

[51] Int. Cl.$^5$ .............................................. G06F 5/00
[52] U.S. Cl. ............................. 364/715.03; 364/745; 364/748
[58] Field of Search ..................... 364/715.03, 745, 748

[56] References Cited

U.S. PATENT DOCUMENTS

| 4,949,291 | 8/1990 | Saini | 364/715.03 |
| 5,161,117 | 11/1992 | Waggerev, Jr. | 364/715.03 |
| 5,170,371 | 12/1992 | Davley | 364/745 |

Primary Examiner—David H. Malzahn
Attorney, Agent, or Firm—Owen L. Lamb

[57] ABSTRACT

Apparatus for converting to a single precision or double precision number an extended precision floating point number comprised of a sign field, an exponent field and a mantissa field. A sticky generation logic connected to the mantissa bus calculates rounding bits for single and double precision and places the rounding information at a sticky output. Overflow and underflow detection logic connected to the exponent bus detects exponent overflow and underflow and generates an overflow output signal. Rounding and conversion control logic connected to the sticky output utilizes the type of conversion that has been specified and the rounding information at the sticky output for producing conversion controls at a control output and a conversion type signal output. A positional incrementer connected to the exponent bus, to the mantissa bus, and to the rounding and conversion control logic places on an incrementer output, the incremented number in response to the conversion type signal output of the rounding and conversion control logic. A conversion mux is connected to the exponent bus, to the mantissa bus, to the output of the positional incrementer and to the control output of the rounding and conversion control logic. In response to the control output of the rounding and conversion control logic means, the conversion mux places either the exponent bus and the mantissa bus, or the output of the positional incrementer means on a conversion output of the conversion mux.

5 Claims, 2 Drawing Sheets

STORE ROUNDING IN A FLOATING POINT UNIT

CROSS REFERENCES TO RELATED APPLICATIONS

Copending patent application Ser. No. 860,987 filed Mar. 31, 1992, of Jack T. Poon, entitled "Floating Point to Integer Conversion in a Floating Point Adder;" assigned to Intel Corporation, the assignee of the present invention.

BACKGROUND OF THE INVENTION

1. Field of the Invention

The present invention relates to data processing systems, and more particularly to apparatus for store rounding in the floating-point unit of a microprocessor.

2. Background Art

The above referenced patent application Ser. No. 860,987 describes a floating-point unit of a microprocessor. A register file is provided for storing floating point numbers that are in the form of sign, exponent and mantissa. Numbers are operated upon within an adder, multiplier and divider in an internal precision form giving an unrounded result. Prior to storing the result in the register file, it must be rounded and converted to single precision, double precision or double extended precision as chosen by the user. After the result is written to the register file the user will typically write the result to memory in either single, double or extended precision. When numbers are written to the register file the mantissa may be rounded to one of the three precisions, but the number actually appears in the register file in internal precision. Thus, when a store to memory is performed the number must be rounded and converted to a chosen target precision. Even though the register file holds internal precision numbers, they always fit within the extended precision range and therefore no rounding is needed for extended precision writes. Rounding is only needed for single and double precision writes.

In the prior art, the various steps required are performed sequentially. First the mantissa is rounded, and a new rounded mantissa is generated. If there is a mantissa overflow, an overflow logic shifts the mantissa right to normalize the number. The exponent is then incremented by one to get the next order of magnitude for the number, because if the mantissa is shifted one order of magnitude lower, the exponent has to be incremented to one order of magnitude higher. Then the number is converted to the target precision. In the past, this conversion included a time consuming add to rebias the exponent. In addition, overflow and underflow must be detected. This sequential process is slow, requiring more than one clock cycle.

It is an object of the present invention to provide a floating-point-unit in which the rounding and conversion of a sign, exponent and mantissa in extended or internal precision format to a single or double precision floating-point number is performed in one clock cycle.

SUMMARY OF THE INVENTION

Briefly, the above object is accomplished in accordance with the invention by providing a sticky generation logic connected to a mantissa bus that calculates rounding bits for single and double precision and places the rounding information at a sticky output. Overflow and underflow detection logic connected to an exponent bus detects exponent overflow and underflow and generates overflow and underflow output signals. Rounding and conversion control logic utilizes the type of conversion that has been specified and the rounding information at the sticky output for producing conversion controls at a control output. A positional incrementer connected to the exponent bus, to the mantissa bus, and to the rounding and conversion control logic places on an incrementer output, the incremented number, in response to the conversion type signal output of the rounding and conversion control logic. A conversion mux connected to the exponent bus, to the mantissa bus, to the output of the positional incrementer and to the control output of the rounding and conversion control logic in response to the control output of the rounding and conversion control logic, places either the exponent bus and the mantissa bus, or the output of the positional incrementer means on a conversion output of the conversion mux.

The invention has the advantage that because the various functions are performed in parallel the rounding and conversion of a mantissa in extended or internal precision format to a single or double precision floating-point number is accomplished in one clock cycle.

BRIEF DESCRIPTION OF THE DRAWINGS

The invention will be apparent from the following more particular description of the preferred embodiment of the invention as illustrated in the accompanying drawings, wherein.

DESCRIPTION OF THE PREFERRED EMBODIMENT

The Intel 80486 microprocessor stores real numbers in a three-field binary format similar to exponential notation. There are three different types of precision in floating point: single precision, double precision, and extended precision. In the diagram below, the relative positions before rounding of the least significant bit of the mantissa (L), the round (R), and sticky bits (S) are shown.

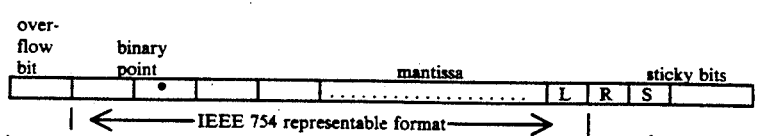

A floating point number X is representable by the following expression:

$$X = (-1)^{s} * 2^{e-b} * (1.f)$$

where:
s is a sign bit
e is an exponent biased by b, and
f is a fraction after the binary point In order to keep all exponents positive, there is a different bias (b) for each precision.

For single and double precision, the number (X) is typically represented in storage by the following bit string:

| s | e | f |
|---|---|---|

To perform arithmetic operations on numbers stored in the above format, the processor will unpack the bit strings into their component sign (s) exponent (e) and fraction (f) with an implicit leading 1 (1.f). Thus, the significant bit field represents a bounded value $1 \leq 1.f < 2$ for all non-zero numbers. The value of zero is represented by e=0 and f=0. Other conventions include reserving extreme values (such as e=0 and e=$e_{max}$=11 ... 1) to designate special operands.

Floating point number representations are further classified by the number of bits in the exponent (e) and fraction (f) fields. TABLE I summarizes the format parameters for several binary floating point number formats conforming to the IEEE standard (ANSI/IEEE Std. 754-1985).

TABLE I

| PARAMETER | SINGLE PRECISION | DOUBLE PRECISION | DOUBLE EXTENDED |
|---|---|---|---|
| p-precision bits | 24 | 53 | $\geq 64$ |
| $E_{max}$-max. exp. | +127 | +1023 | $\geq +16383$ |
| $E_{min}$-min. exp. | −126 | −1022 | $\leq -16382$ |
| E exponential bias | +127 | +1023 | unspecified |
| e width in bits | 8 | 11 | =15 |
| format width-bits | 32 | 64 | $\geq 79$ |

The following illustrates the three formats set forth in TABLE I and the internal format referred to throughout this specification.

Single precision:
| 1 | 8 | 23 bits |
|---|---|---|
| s | e | f |

Double precision:
| 1 | 11 | 52 bits |
|---|---|---|
| s | 3 | f |

Double extended precision:
| 1 | 15 bits | 64 bits |
|---|---|---|
| s | e | f |

Internal precision:
| 1 | 17 bits | 68 bits |
|---|---|---|
| s | e | f | f in double extended and internal formats includes the "implied bit" to the left of the binary point, whereas in the double and the single formats, f does not include this bit (it is implied).

Figure 1:
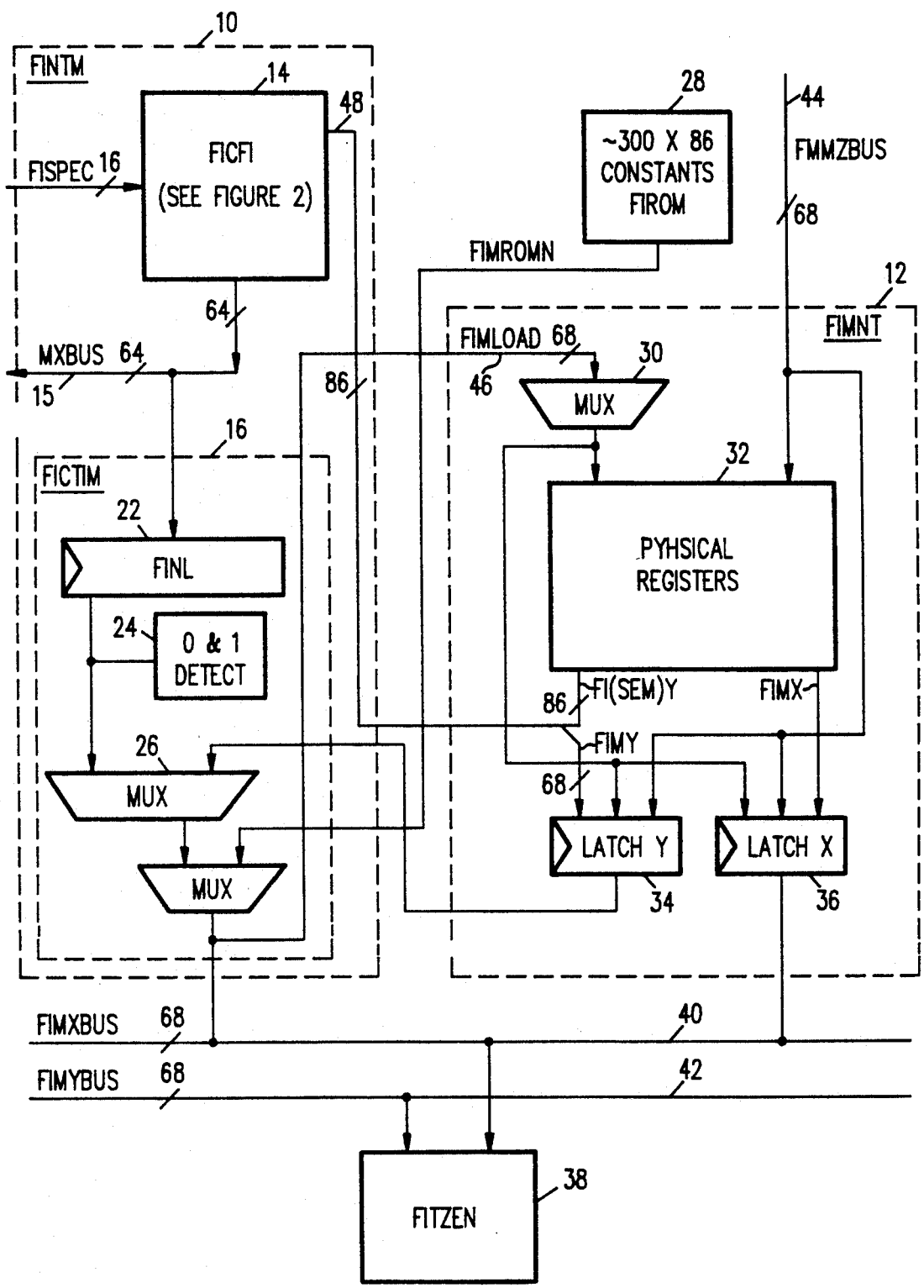
FIG. 1 is a block diagram of a floating point interface, register file, and control (FIRC) portion of a floating point unit in which the invention is embodied.

FIG. 1 is a block diagram of a floating point interface, register file, and control (FIRC) portion of a floating point (FP) unit in which the present invention is embodied. An overall description of the floating point (FP) unit is found in the above-referenced patent application Ser. No. 860,987. FIRC contains a floating-point register stack and working registers, a FP constant ROM, a store-rounding unit, an integer interface hardware and the status word, control word and tag word registers.

FIRC receives and decodes microinstruction vectors from an instruction sequencer. FIRC can read a value from the FP register file (32), or it can read a value that is sent from memory or the integer register file via the MXBUS (15). FIRC is also capable of driving a value onto the MXBUS to be sent to other units. FIRC sends operands and start signals to the execution units. It can also write values into the register file for simple instructions or for register transfers. FIRC receives arithmetic results and writes these values into the register file (either one of the eight architecturally-defined stack registers or one of eight working registers).

The FIRC is split up into datapath and control. The datapath is split up into several functional units while the control can be thought of as one functional unit which will be referred herein as CONTROL (not shown). All of the datapath functions described here are controlled by signals from the CONTROL.

The datapath is divided into six different functional units: mantissa interface FINTM (10), exponent interface FINTE (not shown), mantissa datapath FIMNT (12), exponent datapath FIEXP (12), constant ROM FIROM (28), and trailing zero encoder FITZEN (38). The functional unit (10) is split into two blocks: convert to internal FICTIM (16) and convert from internal FICFI (14).

The MXBUS (15) is connected to the FINTM functional unit. Inside this FINTM functional unit, there is the FICTI block (16) which can read values off of the MXBUS and the FICFI block (14) which can drive values onto the MXBUS. Mantissa data is sent from the FIRC to the execution units (FADD, FMUL, and FDIV) on the FIMXBUS and FIMYBUS. Exponent data is sent on the FIEXBUS and FIEYBUS. The sign is sent on the FIXBUS and FISYBUS. The mantissa result is sent to the FIRC on the FMMZBUS (44), the exponent result on the FEEZBUS and the sign result on the FESZBUS. The FI[SEM]LOAD bus (46) can be written by either FIROM (28) or by FICTIM (16). This bus is an input to the register file (32).

FINTM

The FINTM (10) is responsible for converting numbers in their external representation (single precision, double precision, extended precision, etc.) to and from a single unified format representation (internal precision described above). The extra precision provided by the internal precision format is needed for different internal operations that are performed. The conversion to internal format is done by the FICTI block (16) and the conversion from internal format is done by the FICFI block (14).

FIMNT

FIMNT contains the mantissa register file (32) and the mantissa latch X and Y (36 and 34). The register file has two read ports and two write ports.

This functional unit receives the result number from the FMUL section on the FMMZBUS (44) and the X1 load data from the FICTI block or the FIROM functional unit on FIMLOAD (46).

A 2:1 mux (30) is used for several primitives needed for the transcendental instructions. This mux allows certain operations to take place on the sign bit and also allows the zeroing out of a certain number of least-significant bits in the mantissa.

Latch X (36) and latch Y (34), are used to hold the two operands after they are read out of the register file, or after they are sent from a bypass.

FIEXP

The function of FIEXP is very similar to that of FIMNT and is not shown in FIG. 1. Only the differences will be explained here. A latch X contains a 2:1 mux before its constant input. This allows either the constant zero or the constant 'h1003E to be loaded into this latch. The latter constant is needed for the FIST instruction.

A 3:1 mux in from the X1 port of the register file is needed to force either all ones on the exponent, all zeros on the exponent, or to pass the exponent through. This mux can also force the LSB of the exponent to one while leaving the rest of the exponent alone.

FIROM

FIROM (28) contains all of the architecturally-defined constants as well as those needed for the complex instructions. This block is a ROM that can write its output onto the FI[SEM]LOAD bus. After the value is written onto this bus it can be loaded into the register file by the FIMNT and FIEXP functional units.

The FIROM receives an address and a write-enable signal from the CONTROL (not shown). The write enable allows FIROM to write its data onto the FI[SEM]LOAD bus.

FITZEN

The FITZEN (38) is the trailing zero encoder. This counts the number of trailing zeros on the FIMXBUS and the FIMYBUS and delivers an encoded count on FITZX and FITZY. The outputs of this functional unit are used in the FADD and FMUL sections to calculate the sticky bit needed for rounding.

FICFI

Figure 2:
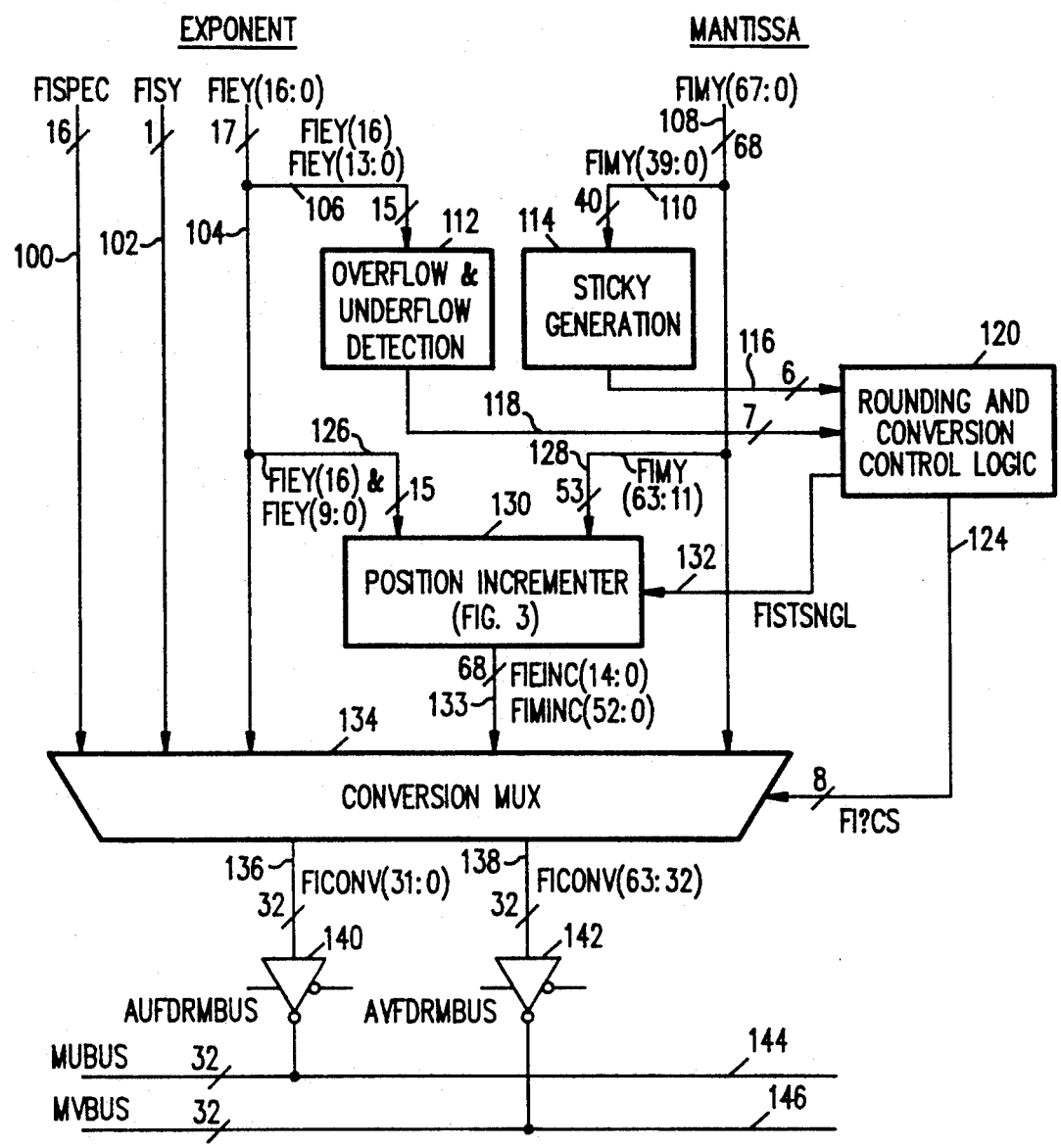
FIG. 2 is a block diagram of the FICFI logic block shown in FIG. 1.

The block diagram of FICFI (14) is shown in FIG. 2. This is the hardware that embodies the present invention. FICFI is responsible for converting numbers in internal precision to an external representation. This is the opposite function of FICTI. This requires rounding sometimes and other times it only requires reformatting of the number. The data inputs to the FICFI come from the register file (FI[SEM]Y) and from CONTROL (FISPEC—this input from CONTROL is for the special registers such as the CW and the SW). The inputs are ready in the beginning of the E stage and the outputs are ready towards the end of the E stage.

This block is able to do nine different types of conversions in all: real 2, real 4, real 8, integer (all data lengths are the same for this data type), ordinal 8, ordinal 4, ordinal 2, exponent 4, and exponent 2. The present invention is concerned with real 4 and real 8 conversions which correspond to single and double precision, respectively.

Rounding occurs by incrementing the number (130) and in parallel performing the sticky detection (114) and rounding calculation (120). When the rounding logic (120) has finished, the conversion mux (134) selects either the incremented or nonincremented number.

As soon as the number is available, the overflow and underflow detection (112) begins working and delivers a result to CONTROL (not shown). At the same time, the sticky generation (114) calculates the different rounding bits for single and double precision and sends this information to the rounding logic (120). The rounding logic takes into account the type of conversion that has been specified by microcode and the rounding information and calculates the controls for the conversion mux (134). By the time the controls for the mux have been calculated, the input number has been incremented by the positional incrementer (130) and this value (133) may be selected by the mux if necessary.

The positional incrementer (130) is a 64-bit incrementer that is required only for rounding. It is capable of adding a one to bit position zero or position 29. If the number must be stored to double precision, the one is added to position zero, and if the number must be stored to single precision, the one is added to position 29.

For single and double precision, the j bit (the implied bit to the immediate left of the binary point) and the 52 bits to the right of the j bit are appended to the exponent after the exponent has been converted to double precision (11 bits). This whole vector is then sent to the incrementer. The case of mantissa overflow (where the mantissa must be shifted right one place and the exponent must be incremented by one) is taken care of automatically since the exponent (126) is appended to the mantissa (128) before going into the incrementer (130). When the mantissa overflows, the exponent is automatically incremented by the carry out of the mantissa. Furthermore, the mantissa need not be shifted right by one in this case because the only time when the mantissa may overflow as a result of rounding is when the original number was all ones. In this case, the final number has an implied bit of one (this number is 'implied' and is not written to memory) and the rest of the mantissa is all zeros. Since zero shifted right one place is still zero, no shift is required.

If the exponent overflows or underflows, then the number cannot be represented in the target format and the appropriate error condition must be signaled. The overflow and underflow checks are performed before rounding for speed. For double precision, the exponent is checked to see if it is $\geq$43FE and $\leq$3C00 (these checks are done on the extended precision exponent). For single precision, the exponent is checked to see if it is $\geq$407E and $\leq$3F80. If so, the number has overflowed or underflowed. Since this check is done before rounding, a fix up may be necessary after rounding if the rounding operation resolves the overflow or underflow condition. An internal microcode routine is provided to detect this and perform the appropriate fix up steps. In the usual case no fix up is necessary and hence no slow down occurs.

For extended precision, none of the above is required, since no rounding is necessary and no overflow or underflow can occur.

The conversion mux (134) is a 64-bit multiplexer. This mux is 7:1 in its worst case (in certain places it is only 4:1). It moves bits around and performs any reformatting that is required. There are four possibilities: incremented single precision, unincremented single precision, incremented double precision, and unincremented double precision. The following explains the exact connections required for the conversion mux (134) to perform the four conversions (there are other conversions that are possible that are not relevant to the present invention and thus are not described here):

For incremented single precision ficonv [31:0] (ficonv [63:32] is "don't care) is set equal to:

fisy, fieinc [10], fieinc [6:0], fiminc [51:29]

For unincremented single precision ficonv [31:0] (ficonv [63:32] is "don't care") is set equal to:

fisy, fiey [16], fiey [6:0], fimy [65:43]

For incremented double precision ficonv [63:0] is set equal to:

fisy, fieinc [10:0], fiminc [51:0].

For unincremented double precision ficonv [63:0] is set equal to:

fisy, fiey [16], fiey [9:0], fimy [65:14]

The FICFI drives the MXBUS (144, 146) when the instruction sequencer asserts the AXFDRMBUS signals to the gates (140 and 142).

The bits 13:0 and bit 16 from the exponent bus (104) are inputted to the overflow and underflow detection logic (112), which detects overflow and underflow. By removing bits 14 and 15, the number is converted from internal precision to extended precision. The number on the bus (104) will at this point always be within the extended precision range, so no loss of precision is encountered.

Figure 3:
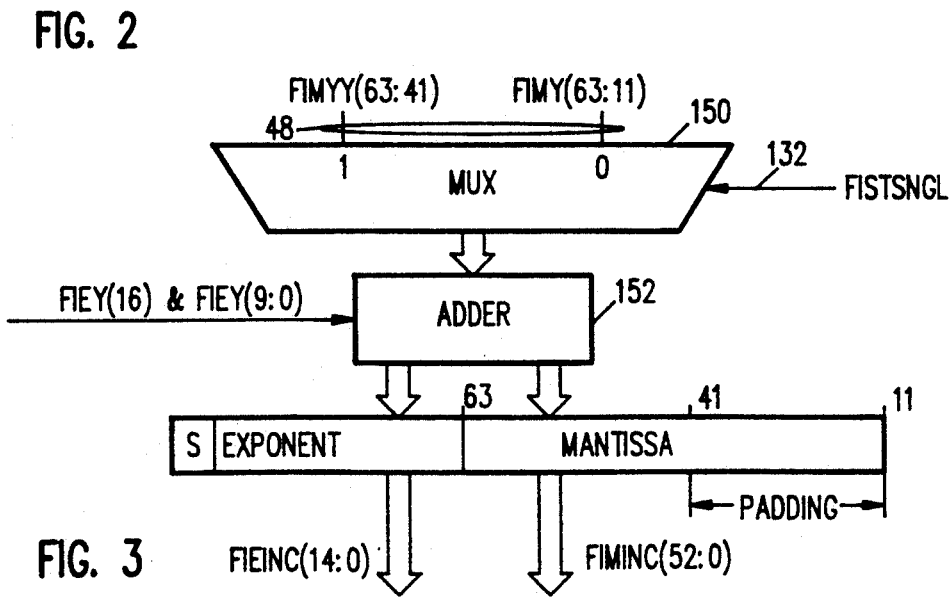
FIG. 3 is a block diagram of the positional incrementer logic block shown in FIG. 2.

Bits 9:0 and 16 from the exponent bus (104) and bits 63:11 from the mantissa bus (108) are sent to the positional incrementer (130) shown in FIG. 3. By removing bits 15:10 of the exponent, the exponent is converted into a double precision exponent. If the exponent does not fit into double precision format, then this is detected by the overflow and underflow detection logic. With the present invention, this detection is performed in parallel with the conversion. If a conversion is being made from an extended-precision mantissa to a double-precision or a single-precision mantissa, the rounding has to be done in one of two different places. The positional incrementer (130) does this function. It is comprised of a mux (150) and an adder (152). The input FIMY[63:11] is selected for double precision, as signified by the FISTSNGL line (132) being equal to zero. The FIMY[63:41] is selected to store the number in single precision, corresponding to the FISTSNGL line (132) being equal to one. The least-significant bits in the difference between double and single precision are filled with ones (padding) for the single-precision case. This is done so that the adder logic (152) can be used for both the double-precision number and the single-precision number. The result of this operation is either the internal precision number with least-significant bits (bits 13:0) chopped off (the double-precision case) or the internal-precision number with bits 42:14 filled (padded) with ones (the single-precision case) and bits 13:0 chopped off. This result is fed to the adder. In either case a one is added to the number. If it is a double-precision number, the 1 is added to the least-significant bit (LSB) position and it is rounded up. If it is a single-precision number, a one is added at the least-significant bit. Since these positions were padded with ones, the one added to the LSB will cause a carry to ripple through the number and end up adding a one to the LSB of the single precision number (bit 43 of the internal precision number).

The double precision exponent (an 11-bit exponent for double precision) is selected and concatenated with the correct mantissa from the mux and fed to the adder. If there is a mantissa overflow, it will carry out to the exponent field and increment the exponent automatically. The output from this logic is the incremented exponent and mantissa.

If it was necessary to increment the number to do rounding, the mux (134) uses the output (133). If incrementing is not necessary and only a truncation is to take place, then the inputs (104, 108) are selected by the input (124). This technique eliminates one stage of logic, the overflow logic for the mantissa and allows the increment necessary for rounding to happen in parallel with the actual rounding calculation.

It is not necessary to normalize the resultant number because the only time mantissa overflow can occur is when the number is 1.111...1 and a one is added to the number resulting in 10.000...0. If logic were to shift all zeros right by one, or not shift all zeros right by one, the result would be the same. Since in single precision and double precision the one bit to the left of the binary point is implied, this bit is thrown away and not explicitly stored in memory. So the mantissa normalization step is not necessary and the exponent has been incremented automatically.

The final rounding selection can now take place. Two determinations must be made, first is the number to be represented in single or double precision, and second, should a one be added to the number to round it, or should it just be truncated.

In parallel with the incrementing just described, the sticky bits (S bits) are generated by the sticky-generation logic (114). These, along with the L and R bits, are fed to the rounding and conversion control logic (120), which takes the single-precision and double-precision information and determines the appropriate rounding. Once this has been determined, the control logic generates the appropriate outputs (124) for control of the conversion mux (134).

Overflow and underflow detection (112) is done in parallel with the other operations before the rounding takes place. If the mantissa underflows in double precision and the conversion is to double precision, then the machine flushes and jumps to an internal microcoded exception handler.

An exponent overflow can occur as a result of a mantissa overflow. Similarly, an exponent underflow can go away as a result of mantissa overflow. That is, a number below the range can be bumped up into the range. In these borderline cases, a floating-point exception handler in microcode handles the situation. So, limits have been changed by one so that the detection can be done quickly and in parallel. If there is an underflow or overflow, then the logic invokes the floating-point exception handler that fixes the number to its correct representation after the logic is finished. The advantage is that this parallel logic is very fast. The disadvantage is that the logic will sometimes signal underflow or overflow for conditions that are really not. For those situations, the operation will be very slow, but these are rare.

While the invention has been particularly shown and described with reference to preferred embodiments thereof, it will be understood by those skilled in the art that the foregoing and other changes in form and detail may be made therein without departing from the scope of the invention.

What is claimed is:

1. Apparatus for converting to a single precision or double precision number an extended precision floating point number comprised of an exponent field on an exponent bus and a mantissa field on a mantissa bus comprising:

a sticky generation logic means connected to said mantissa bus for calculating rounding bits for single and double precision and placing rounding information at a sticky output of said sticky generation logic means;

overflow and underflow detection logic means connected to said exponent bus for detecting exponent overflow and underflow and for generating an underflow and overflow output signal;

rounding and conversion control logic means connected to said sticky output of said sticky generation logic means for utilizing a specified type of conversion and said rounding information at said sticky output for producing conversion controls at a control output and a conversion type signal output;

a positional incrementer means connected to said exponent bus, to said mantissa bus, and to said rounding and conversion control logic means for placing on an incrementer output thereof, either the incremented or nonincremented number in response to said conversion type signal output of said rounding and conversion control logic means; and, a conversion mux connected to said exponent bus, to said mantissa bus, to the output of said positional incrementer means and to said control output of said rounding and conversion control logic means for, in response to said control output of said rounding and conversion control logic means, placing either said exponent bus and said mantissa bus, or the output of said positional incrementer means on a conversion output of said conversion mux.

2. The apparatus in accordance with claim 1 wherein said positional incrementer further comprises:

means for selectively, in response to said conversion type signal output of said rounding and conversion control logic means, adding a one to a first bit position of said mantissa upon the condition that said conversion type signal output indicates that a number is to be stored to double precision and for adding a one to a second position of said mantissa, and upon the condition that said conversion type signal output indicates that a number is to be stored to single precision.

3. The apparatus in accordance with claim 2 wherein said positional incrementer is a 64-bit adder and said first position is bit zero of said adder and said second position is bit 29 of said adder.

4. The apparatus in accordance with claim 2 wherein said positional incrementer further comprises:

means for appending said exponent field to said mantissa field at an input to said adder such that a carry out of said mantissa field of said adder is added to said exponent field of said adder.

5. The apparatus in accordance with claim 4 wherein said positional incrementer is a 64-bit adder and said first position is bit zero of said adder and said second position is bit 29 of said adder.

* * * * *

UNITED STATES PATENT AND TRADEMARK OFFICE
CERTIFICATE OF CORRECTION

PATENT NO. : 5,235,533
DATED : August 10, 1993
INVENTOR(S) : Jonathan Sweedler

It is certified that error appears in the above-indentified patent and that said Letters Patent is hereby corrected as shown below:

Column 3, line 49, Delete "3"  Insert --e--

Signed and Sealed this

Twenty-sixth Day of July, 1994

Attest:

BRUCE LEHMAN

*Attesting Officer*        *Commissioner of Patents and Trademarks*